United States Patent [19]

Laie

[11] Patent Number: 4,699,394
[45] Date of Patent: Oct. 13, 1987

[54] SAFETY HAULING COUPLER

[76] Inventor: Ching H. Laie, No. 3, Ming-ii Street, West District, Taichung City, Taiwan

[21] Appl. No.: 831,843

[22] Filed: Feb. 24, 1986

Related U.S. Application Data

[63] Continuation-in-part of Ser. No. 665,067, Sep. 27, 1984, Pat. No. 4,593,925.

[51] Int. Cl.[4] .............................................. B60D 1/14
[52] U.S. Cl. ...................................... 280/493; 280/484
[58] Field of Search ............... 280/480, 481, 482, 483, 280/484, 486, 487, 493, 504, 506

[56] References Cited

U.S. PATENT DOCUMENTS

| | | | |
|---|---|---|---|
| 1,535,397 | 4/1925 | Buffington | 280/493 |
| 1,768,304 | 6/1930 | Ayler | 280/493 X |
| 2,694,357 | 11/1954 | Lee | 98/1 |
| 2,721,715 | 10/1955 | Hoadley | 244/130 |
| 3,062,484 | 11/1962 | Himka | 244/53 |
| 3,265,331 | 8/1966 | Miles | 244/53 |
| 3,430,640 | 3/1969 | Lennard | 137/15.1 |
| 3,524,458 | 8/1970 | Goldsmith | 137/15.1 |
| 3,578,265 | 5/1971 | Patierno et al. | 244/42 |
| 3,624,751 | 11/1971 | Dettling | 137/81.5 |
| 3,752,422 | 8/1973 | Runnels et al. | 244/118 R |
| 3,905,566 | 9/1975 | Anderson | 244/53 B |
| 4,463,772 | 8/1984 | Ball | 137/15.2 |

FOREIGN PATENT DOCUMENTS

| | | | |
|---|---|---|---|
| 2359692 | 6/1975 | Fed. Rep. of Germany | 280/482 |
| 2516314 | 10/1976 | Fed. Rep. of Germany | 280/482 |
| 3422251 | 12/1985 | Fed. Rep. of Germany | 280/493 |
| 2146962 | 5/1985 | United Kingdom | 280/493 |

Primary Examiner—John J. Love
Assistant Examiner—Charles R. Watts
Attorney, Agent, or Firm—Ladas & Parry

[57] ABSTRACT

The present invention comprises a safety towing coupler having a buffer rod, a spring, two annular bodies, two connection rods, two extension rods, two sleeve pipes and two connection hooks. Each connection hook has an eccentric hole and an inverted hook. The safety towing coupler also includes a pair of steel cables, each cable having an annular joint at each end thereof. One end of each steel cable extends through the connection hook into the extension rod where it is secured by pins. The steel cable passes through the eccentric hole, attaches to the vehicle to be towed and the free end of the cable then attaches to the inverted hook by means of its annular joint. The connection hook comprises forked portions, each having a groove therein, and the steel cable passes through these grooves. The spring, which surrounds the buffer rod, is prevented from movement of the buffer rod by annular bodies.

1 Claim, 3 Drawing Figures

SAFETY HAULING COUPLER

CROSS REFERENCES TO THE RELATED APPLICATION

The present invention is to a continuation-in-part of the inventor's application Ser. No. 655,067, now U.S. Pat. No. 4,593,925, entitled Safety Hauling Coupler, filed on Sept. 27, 1984.

The disclosure of U.S. patent application Ser. No. 655,067, filed Sept. 27, 1984, is hereby incorporated by reference.

BACKGROUND OF THE INVENTION (a) Field of the Invention

The present invention relates to an improved towing coupler for connecting a vehicle to be towed (the "towed vehicle" to a towing vehicle (the "tow vehicle").

(b) Description of the Prior Art

The present invention is an improvement in the inventor's application Ser. No. 655,067 particularly taking into account the huge hook ring of the American automobiles which is different from that of the Asian automobile system.

In the applicant's former application, two ends of each of two steel cables (6) are in an annular joint. During the towing operations, the two steel cables (6) must go through the hook ring or the bumper requiring four actions to hook up the connection hook and this wastes a lot of time. During the use of the steel cable (6), which may possess some elasticity, due attention must be paid to the effect produced when the two annular joints (61) (62) are positioned. Thereafter, the sleeve pipe (4) can be pulled to conduct the restricting action, otherwise, the two annular joints (61) (62) can move and possibly come loose from the connection hook (5) during the pull of the sleeve pipe (4), thus resulting in no connection therebetween, so the same operating procedure must be repeated. Additionally, as the components in the former case are divided into three types, sometimes it is hard to locate the right components on the spot during use.

Therefore, although the applicant's former application has improved the defects of many similar products, it still takes a little longer to operate, in terms of the vehicular rescue operations. It would be much more efficient if it was made a far more convenient and time saving operation.

SUMMARY OF THE INVENTION

The present invention provides for a safety towing coupler including a buffer rod, a spring sleeved on the buffer rod, a link to be sleeved on the buffer rod, an extension rod connected to the link, and a sleeve pipe to be sleeved on the extension rod.

Each of the two ends of two steel cables has an annular joint respectively which extends through the connection hook and enters into the extension rod and is then pinned by a pin. The connection hook has an inverted hook and an eccentric hole to receive the steel cable passing therethrough. On each end of the connection hook (5), there exist two fork type parts (53), which are grooved (54) (55). The steel cable passes through the eccentric hole, attaches to the towed vehicle and then is turned back so that its annular joint hooks up to the inverted hook. Part of the steel cable (6) is inserted into the grooves mentioned above with annular bodies to ensure its ends do not expand over the link.

DESCRIPTION OF THE PREFERRED EMBODIMENT

Figure 1:
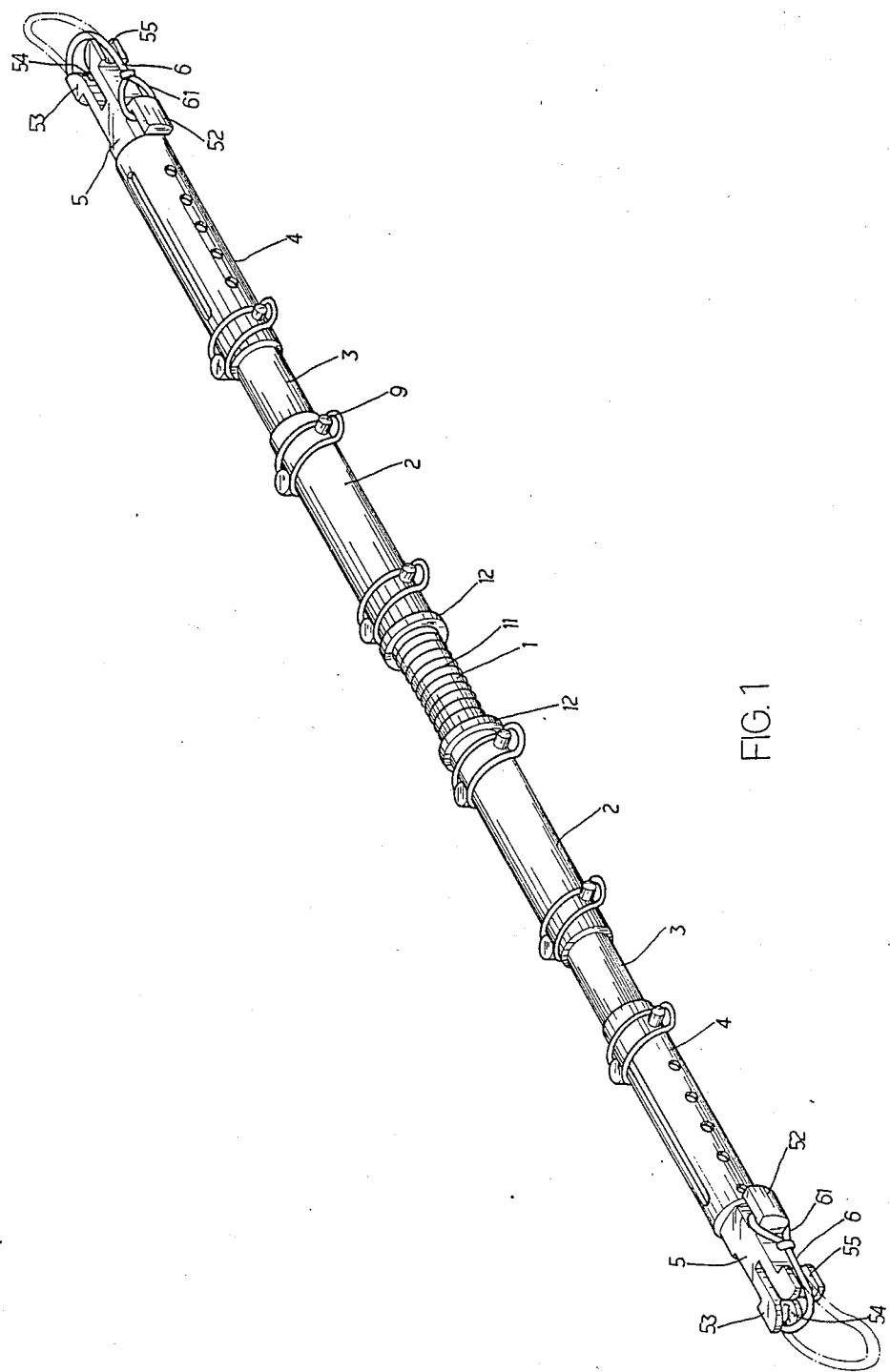
FIG. 1 is a perspective view of the present invention.
Figure 2:
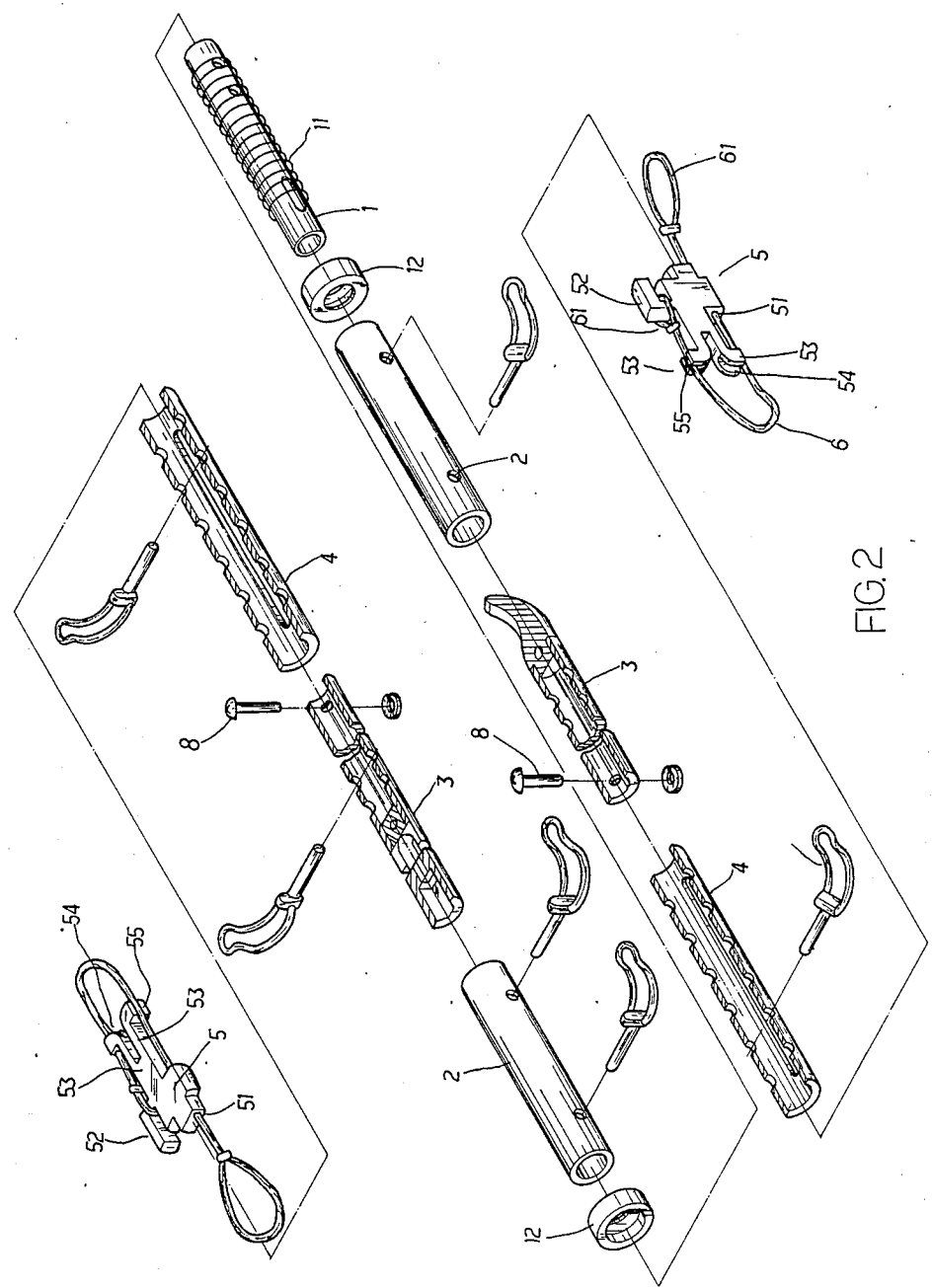
FIG. 2 is an exploded view of the present invention.
Figure 3:
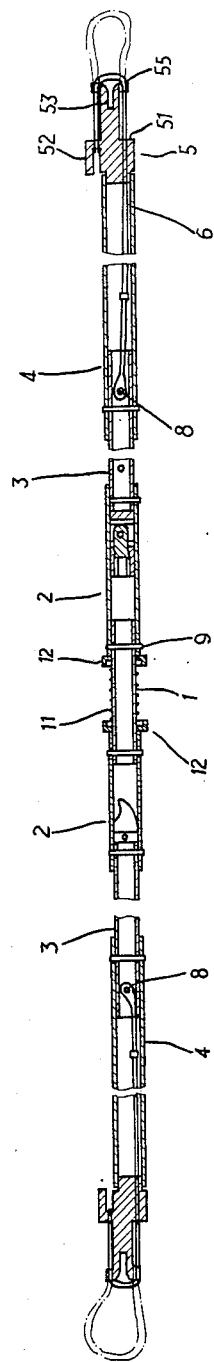
FIG. 3 is a cross sectional view of the present invention.

As shown in FIGS. 1-3, the present invention is composed of a buffer rod (1), a spring (11), two annular bodies (12), two links (2), two extension rods (3), two sleeve pipes (4), two connection hooks (5), each with an eccentric hole (51) and an inverted hook (52), two steel cables (6) each with two annular joints (61), two pins (8), six rivets (9) and other necessary accessories. The spring (11) is sleeved on the link, and an annular body (12) is sleeved near each of the two ends of the spring respectively to avoid any expansion of the two ends of the spring (11) for sleeving on over the link (2). The two links (2) are respectively connected to an extension rod (3) by rivets (9). The two extension rods (3) are also respectively fixed on a sleeve pipe (4) by rivets (9).

Each of the two ends of the two steel cable (6) respectively has an annular joint (61). The cable extends and passes through the eccentric hole (51) of connection hook (5). A pin (8) is pinned on the extension rod (3) to connect the extension rod and to avoid loosening therefrom. The extension rod (3) allows the sleeve pipe (4) to slide over its outside part, and the sleel cable (6) goes through the sleeve pipe (4). The connection hook (5) has an inverted hook (52) and also a slightly inclined eccentric hole (51) to facilitate the steel cable (6) passing through the inverted hook without adversely affecting the position of the inverted hook. The two fork type parts (53) on each end of the connection hooks have grooves (54) (55).

During operation, the sleeve pipe (4) is pushed toward the buffer rod (1). The annular joint (61) on the free end of the steel cable (6) passes through the hook on the towed vehicle, and to hook on to the inverted hook (52) of the connection hook (5). The coupling operation between the tow and towed vehicle is completed. The said steel cable (6), when tight, is accommodated into the grooves (54) (55). The steel cable in use is thus stabilized.

I claim:
1. A safety towing coupler comprising:
a buffer rod;
a spring about the buffer rod;
a pair of annular bodies at each end of the buffer rod to keep the spring on the buffer rod;
a link secured at each end of the buffer rod;
an extension rod connected to each link at an end thereof remote from the buffer rod;
a sleeve pipe connected to each extension rod at an end thereof remote from the link;
a connection hook located at an end of each sleeve pipe remote from the extension hook, each connection hook comprising an eccentric hole, a pair of forked members each defining a groove, and an inverted hook; and
a steel cable for connection to each connection hook, the steel cable having an annular joint at each of its ends, the one end of the cable extending through the eccentric hole of the connection hook into the extension rod where it is secured, the other end of the cable connecting to the inverted hook, the cable passing through the grooves in the forked member.

* * * * *